Sept. 2, 1958
B. BULOVIC
2,850,691
SPEED CONTROL APPARATUS
Filed June 24, 1955
3 Sheets-Sheet 1
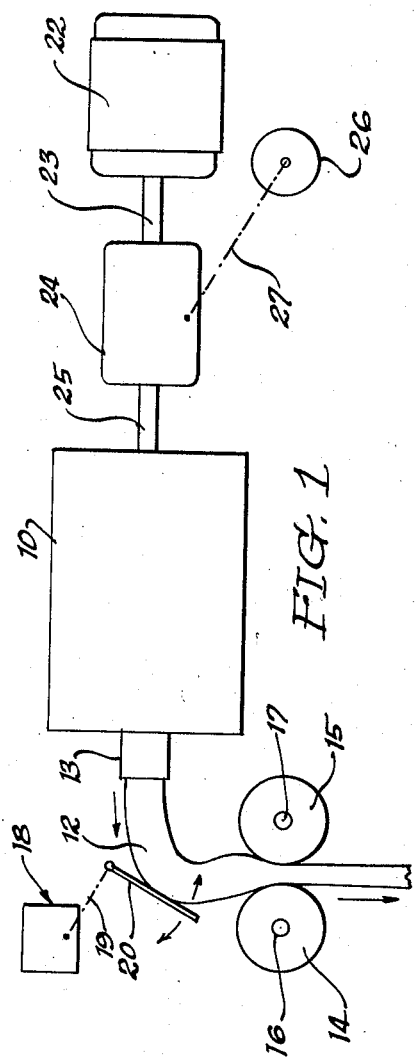
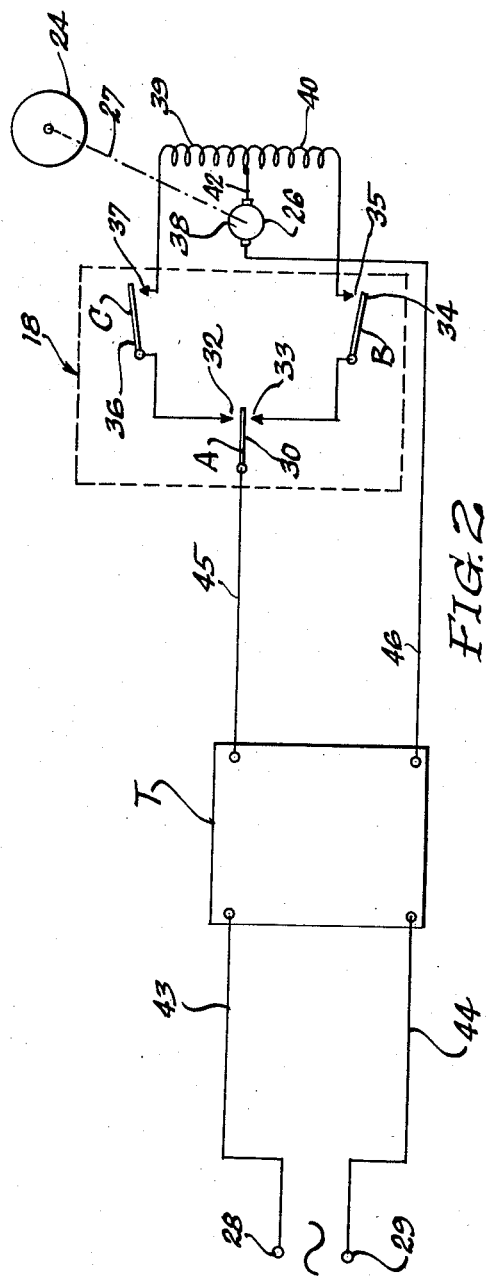
INVENTOR.
Bozdar Bulovic
BY
*F. Thrall Brewer*
Attorney Sept. 2, 1958     B. BULOVIC     2,850,691
SPEED CONTROL APPARATUS
Filed June 24, 1955     3 Sheets-Sheet 2

INVENTOR.
Bozdar Bulovic
BY
Attorney

INVENTOR.
Bozdar Bulovic
BY
Attorney

United States Patent Office 2,850,691
Patented Sept. 2, 1958

2,850,691

SPEED CONTROL APPARATUS

Bozdar Bulovic, Chicago, Ill., assignor to Wm. Wrigley Jr. Company, Chicago, Ill., a corporation of Delaware Application June 24, 1955, Serial No. 517,810

3 Claims. (Cl. 318—257)

This invention relates to speed control apparatus, and more particularly to electrically operated mechanical speed control apparatus which affords accurate control operation and tends to minimize over-control and resultant hunting.

It is a general object of my invention to provide speed control apparatus for regulating the speed of one machine to synchronize its operation on work material with that of another machine, thereby to minimize variations of amount, stresses, flow and the like in the material as it passes from one of the machines to the other.

My invention also has within its purview the provision of electrically operated control apparatus which is accompanied by an interval timer utilized in such a way that the control apparatus is effective at only predetermined regularly spaced intervals, whereby controlling action is effected gradually and in steps.

As another object, this invention comprehends the provision of control apparatus responsive to both direction and magnitude of movements of a sensing structure, and wherein the response to direction of movement is more sensitive to change than is the response to magnitude of movement.

As an example of a specific adaptation, my invention has for an object the provision of apparatus for effecting control of the course of travel of a strand of material between machines or mechanisms in directions lateral to the direction of the travel of the strand between the machines or mechanisms.

Another object of my invention is to provide control apparatus embodying a switching device having series connected switches responsive to movements of the same element, and one of which swtiches is more sensitive to the magnitude of such movements of the element than the other.

These and other objects of this invention will become apparent from the following detailed description when taken together with the accompanying drawings, in which Fig. 1 is a schematic diagram depicting an adaptation of my disclosed control apparatus to a machine adapted to the extrusion of a plastic material, from which machine the material is fed to another machine;

Fig. 2 is a schematic circuit diagram showing electrical connections utilized in a preferred embodiment of my disclosed control apparatus;

Although not considered to be necessarily limited thereto, the exemplary embodiment of my control apparatus which is disclosed herein for illustrative purposes is depicted in an application to the control of the rate of flow or extrusion of a plastic material as it is fed from one machine to another. In the disclosed application, the material which is subject to control by my disclosed control apparatus forms a partial loop as it defines a curved path in moving from a machine from which it is extruded to another machine having rollers annd which performs additional operations on the material. Although the speed of the machine to which the material passes is subject to regulation, such speed may be assumed to be substantially constant for substantial periods when regulated for desired operation. The control apparatus to which this invention is particularly directed is adapted to the maintenance of the speed of the machine from which the material flows within close limits of synchronism with the demand for material by the machine to which it flows, thereby to prevent slippage, over-supply or other disadvantageous results from occurring as a result of non-uniformity of flow or passage between the two associated machines.

Figures 5, 6:
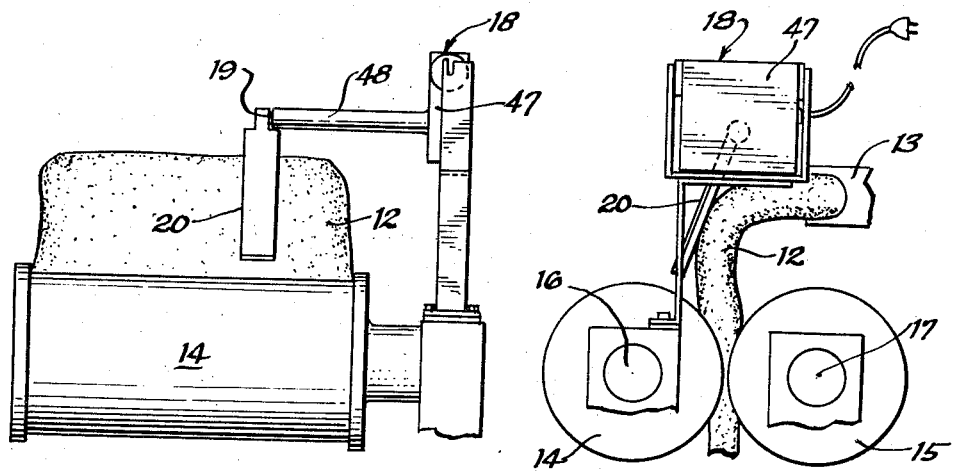
Fig. 5 is a fragmentary end view of a structural embodiment of the apparatus illustrated diagrammatically in Fig. 1, the view being taken toward the left-hand end of the apparatus, as viewed in Fig. 1.
Fig. 6 is a fragmentary side elevational view of the apparatus shown in Fig. 5.

As depicted in Figs. 1, 5 and 6, a machine 10 from which a ribbon of material 12 is extruded through a nozzle 13 may be considered to be a kneading machine adapted to use for kneading large quantities of a chicle material in the production of chewing gum. From the kneading machine 10, the material passes in a curved path to rollers 14 and 15 mounted for rotation in predetermined spaced and substantially parallel relationship on shafts 16 and 17 respectively. As previously mentioned, the speed of operation of the rollers 14 and 15 is subject to regulation, but may be considered to be substantially uniform for periods following such regulation. The herein disclosed control apparatus is adapted to the provision of a substantially uniform supply of the material 12 from the kneading machine 10 to the rollers 14 and 15.

Considered generally, the disclosed control apparatus embodies a switch mechanism 18 operated through movements of a shaft 19 from a feeler element 20 which, in the present instance, is a paddle having a surface which normally rests against the upper or outer surface of the extruded material 12 between the kneading machine 10 and the rollers 14 and 15, and which paddle is normally disposed at an angle such that gravitational forces keep the paddle against the surface of the extruded material although the contour of the path of passage of the material between the machine varies to effect a resultant angular movement of the paddle relative to the axis of the shaft 19, thereby effecting a movement of the shaft and resultant operation of the switch mechanism 18.

In the disclosed structure, the kneading machine 10 is indicated as being driven from a prime mover 22, such as an electric motor, having a shaft 23 from which a mechanical variable speed mechanism 24 is driven. An example of the mechanical variable speed mechanism to which reference is made is the "P. I. V." (positive infinitely variable) speed changing mechanism produced by Link-Belt Company, of Chicago, Illinois. The kneading machine 10 is driven through a shaft 25 from the output side of the mechanical speed changing mechanism 24. The mechanical speed changing mechanism changes the driving speed ratio between the prime mover 22 and the kneading machine 10 with smooth variations of the driving rate of the kneading machine which, in the disclosed apparatus, is regulated to maintain uniformity of the path of the material 12 between the extruding nozzle 13 of the kneading machine and the rollers 14 and 15. For effecting the setting or variation of the driving ratio in the mechanical speed changing mechanism, a reversible motor 26 is utilized, which motor is connected to the mechanical speed changing mechanism 24 through driving means, such as a shaft 27.

One of the problems encountered in the control or regulation of speed and the like for effecting satisfactory and desired operations of machines of the type herein illustrated is the limitation of over-control and the resultant hunting which causes the controlled machines to change back and forth through the desired condition of operation and results in continuing or persistent operation of the control apparatus. For effecting the desired limitation of hunting and for providing the desired control of the mechanical speed changing mechanism through the operation of the reversible motor 26 in the structure herein illustrated, I have provided the switch mechanism 18 and associated apparatus connected electrically to a source of power through terminals 28 and 29, as shown in Fig. 2.

Having reference to the circuit diagram of Fig. 2, the switch mechanism 18 embodies a single pole double throw reversing switch A and single pole single throw switches B and C. The reversing switch A is a normally open switch having a contact arm 30 normally spaced from and alternately engageable with spaced contacts 32 and 33. The switch B is a normally open switch having a contact arm 34 engageable with a contact 35; and likewise, the switch C is normally open and has a contact arm 36 engageable with a contact 37.

The reversible motor 26, as herein illustrated, has an armature 38 and field windings 39 and 40, which field windings have a common connection to the armature 38 through a lead 42. The one of the field windings 39 or 40 which is energized during the operation of the motor determines the direction of rotation of the motor. One end of the field winding 39 is connected to the contact 37 of the switch C, while one end of the field winding 40 is connected to the contact 35 of the switch B. The contact arm 36 of the switch C is connected to the contact 32 of the reversing switch A, and also the contact arm 34 of the switch B is connected to the contact 33 of the switch A.

In order to limit the operation of my control apparatus to regularly spaced time intervals of fixed duration as one element in the limitation of over-control and hunting, I have provided an interval timer T which is connected in the power circuit to the reversible motor 26 and which constitutes apparatus such as a clock motor driving a switch to effect opening and closing of the siwtch during the desired spaced time intervals of fixed duration. Merely as an example of the time intervals which are contemplated, the interval timer T may provide power circuit connections which are open for 15½ seconds and closed for 4½ seconds, so that it is only possible for the reversible motor to operate during 4½ seconds of each 20 seconds. As shown in Fig. 2, the power supply line terminals 28 and 29 are connected through lead wires 43 and 44 to the input side of the interval timer T, while the output side of the interval timer is connected through a lead wire 45 to the arm 30 of the switch A and through a lead 46 to the armature of the reversible motor 26.

Figure 3:
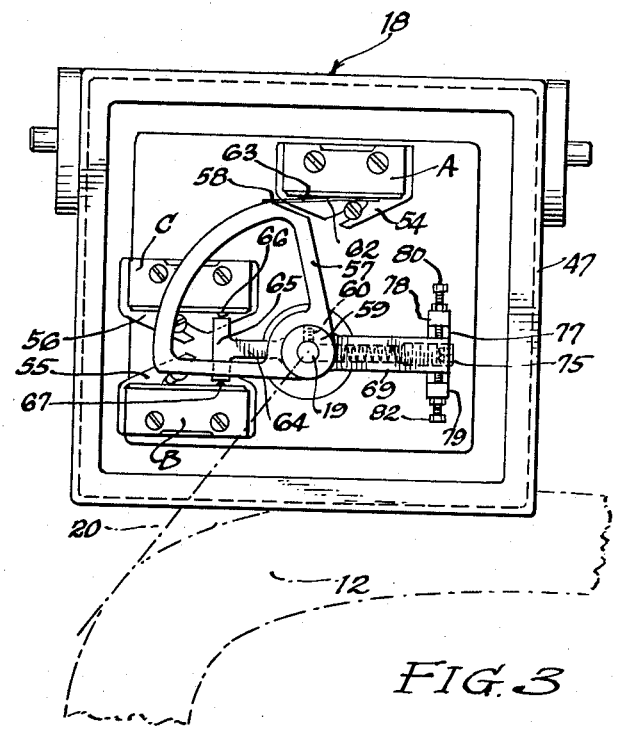
Fig. 3 is a fragmentary front elevational view of a switchbox and switch actuating mechanism of a type adapted to use in apparatus as illustrated in Fig. 1, and includes, in dot and dash lines, a fragmentary illustration of extruded material from which the switch mechanism is actuated, as shown in Fig. 1, and a means by which the switch mechanism is actuated from the extruded material.
Figure 4:
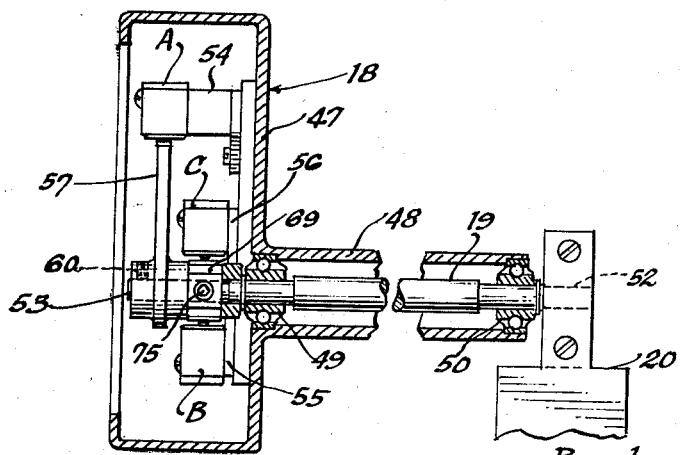
Fig. 4 is a side sectional view of the switchbox and switch actuating mechanism depicted in Fig. 3.
Figure 7:
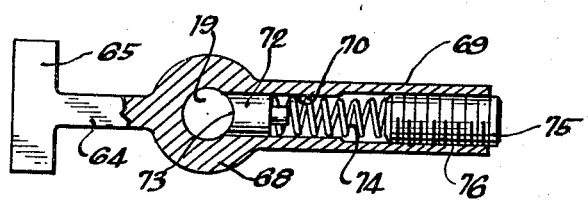
Fig. 7 is a side view of a portion of the switch actuating mechanism illustrated in Fig. 3, with a part thereof shown in section.

As diagrammatically illustrated in Fig. 2, it may be observed that movements of the switch arm 30 of the switch A serve to afford one element of control of the operation and direction of operation of the reversible motor 26. It may also be observed that the operations of the switches B and C must be coordinated with the operations of the switch A in order to effect the resultant operation of the reversible motor 26 in one direction or the other. In my disclosed apparatus, and as depicted in Figs. 3, 4 and 7, mechanical elements which are embodied in the switch mechanism 18 coordinate and afford desired operations of the switches A, B and C.

In the illustrated embodiment, the switch mechanism 18 includes a housing 47 which constitutes a box type structure from one side of which a tubular extension projects for the support and enclosure of the shaft 19 to which the feeler element 20 is secured. Bearings 49 and 50 at opposite ends of the tubular extension 48 of the housing provide supports for the shaft 19 relative to the housing, and the shaft is supported thereby with an end portion 52 extending beyond the tubular extension for attachment to the feeler element and an end portion 53 extending into the box-type portion of the housing. The switch A is secured to the interior of the box-type portion of the housing by a bracket 54 in spaced relationship to one side of the end portion 53 of the shaft, while the switches B and C are respectively secured to the interior of the box-type portion of the housing 47 through brackets 55 and 56 respectively and are mounted in substantially symmetrical relationship to the axis of the end portion 53 of the shaft.

For effecting operations of the switch A in response to rotational movements of the shaft 19, a cam segment 57 having a cam surface 58 and a hub portion 59 is secured to the end portion 53 of the shaft 19 by fastening means such as a set screw 60. As shown in Fig. 3, a resilient leaf spring 62 has one end secured to the housing of the switch A at a distance from a switch actuating element 63 and has its free end normally engaged by and biased into engagement with the cam surface 58 of the segment 57, so that movements of the segment 57 about the axis of the shaft 19 move the cam surface 58 along the leaf spring 62 toward and from the switch actuating element 63, thereby to control the position of the switch A; the resilient leaf spring 62 providing flexibility in the operating assembly of the switch A which allows for a range of movement of the segment 57 about the axis of the shaft 19 in the control of the switch operation and so as to prevent damage to the switch mechanism as a result of relatively large movements of the segment, as well as affording a range of movements of the segment without necessarily producing a resultant change of the position of operation of the switch A.

The switches B and C, in addition to being symmetrically disposed with reference to the axis of the shaft 19, are also mounted in opposed relationship to one another. An operating arm 64 having a head portion 65 disposed between operating elements 66 and 67 of the switches C and B respectively is mounted upon and driven from the end portion 53 of the shaft 19 as illustrated in Fig. 7. This operating arm 64 has an integral hub portion 68 and also includes an integral extending arm portion 69 which projects from the opposite side of the hub portion from the arm 64. The arm portion 69 has an internal axial housing 70 which provides a mounting for sliding movement of a friction element 72, which friction element has an arcuate end surface 73 that frictionally engages a portion of the side surface of the shaft 19. A compression spring 74 extends into the bore 70 and has one end in engagement with the outer end of the friction element 72 and the outer end of the compression spring is engaged and adjustably held in place by a screw 75 which is threaded counterbore 76 in the arm portion 69 and aligned axially with the bore 70. With this structural arrangement, the friction element 72 is resiliently biased into engagement with the surface of the shaft 19 and the force of the biasing spring may be adjusted by turning a screw 75. For normal operation, the compression spring is adjusted so that movements of the shaft 19 are transmitted through the hub 68 to the arm 64 and its head portion 65 with the force developed being sufficient to effect operations of either of the switches B or C depending upon the direction of movement of the shaft. However, the frictional engagement between the shaft 19 and the hub and its friction element provides for slippage of the hub 68 relative to the shaft 19 in the event that the shaft moves farther than is required for effecting operation of one of the switches B or C.

In order to insure limitation of the movements of the arm 64 when the shaft 19 moves beyond a position required for effecting operation of one of the switches B or C, a yoke 77 is secured to the interior of the box-type housing 47, as shown in Fig. 3, and has arms 78 and 79 which carry adjustable set screws 80 and 82, which set screws are aligned with opposite side portions of the arm portion 69 and are adjusted to limit the movements of the arm portion 69 to an amount which insures operation of the switches B and C by the arm 64 and its head portion 65.

In the operation of the control apparatus which is herein disclosed, it may be readily understood that swinging movements of the feeler element or paddle 20 which are caused by a change of the path of movement of material 12 between the extrusion nozzle 13 and the rollers 14 and 15 effect rotational movements of the shaft 19. The reversing switch A and the switches B and C are adjusted and disposed with respect to the segment 57 and the head portion 65 of the arm 64, so that they have open positions corresponding to a normal or desired path of movement of the material 12 between the extrusion nozzle 13 and the rollers 14 and 15. With all of these switches open, the reversible motor 26 does not operate and the speed of operation of the kneading mechanism 10, as controlled by the mechanical speed changing mechanism, remains constant. However, variations in the path of movement of the material 12 may effect swinging movement of the feeler element 20 in either direction, and the resultant direction of movement of the shaft 19 determines the direction of movement of the reversing switch A and effects a selection of the switch B or C which is operated. When the shaft 19 moves in one direction, the arm 30 of the reversing switch A is moved into contact with the contact 32 by the action of the cam surface 58 of the segment 57 against the spring 62 and the switch C is closed by the action of the head portion 65 on the arm 64 against the actuating element 66 of that switch. Likewise, movement of the shaft 19 in the opposite direction causes the arm 30 of the reversing switch A to engage contact 33 and the head portion 65 on the arm 64 effects the closing of the switch B.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. Control apparatus responsive to movements of a feeler means for determining the direction and duration of operation of a reversible electric motor from a source of electric power and comprising, in combination, a reversible electric motor having one power lead connected thereto from the power source through an interval timer which provides power connections to the motor at regularly spaced time intervals of fixed duration, reversing switch means connected in series with one of said power leads to the motor and having open and closed positions for controlling the operation and direction of rotation of the reversible motor when the power connection to the motor is closed through the interval timer, and movaable feeler means for effecting operation of the reversing switch means between said open and closed positions, said feeler means including two switch actuating elements, and said reversing switch means including a single pole double-throw switch having spaced contacts alternately engageable by a movable switch element, which switch element is operable by one of said switch actuating elements, and two additional switches having contact means connected in series with said spaced contacts of the single pole double throw switch and alternately operable by the other of said switch actuating elements in predetrmined sequential relationship to the operations of the reversing switch.

2. Control apparatus as defined in claim 1, and wherein said feeler means also includes a shaft mounted for rotational movement, with one of said switch actuating elements secured to the shaft, and the other said switch actuating elements frictionally driven from the shaft.

3. Control apparatus for operation from an electrical power source for motivating a mechanical speed changing mechanism and comprising, in combination, a reversible electric motor having a main terminal and two selectively usable terminals for determining the direction of motor operation, separately operable switches each having contact means connected in series with one of the selectively usable terminals of the reversible motor, a single pole double throw switch having contact means connected in series with the contact means of said separately operable switches for selectively providing electrical connections to one or the other of the selectively operable switches, means for operating all of said switches in predetermined sequence from a single mechanically movable element, and means for connecting the reversible motor to a power source through the contact means of said switches, said means for operating said switches comprising a shaft having one arm thereon for actuating the single pole double throw switch in relationship to the direction of movement of the shaft from a normal position and a second arm thereon for operating one or the other of the separately operable switches as determined by the direction of movement of the shaft from said normal position.

References Cited in the file of this patent

UNITED STATES PATENTS

| | | |
|---|---|---|
| 2,176,817 | Jacobson et al. | Oct. 17, 1939 |
| 2,465,891 | Lindars | Mar. 29, 1949 |
| 2,502,167 | Moore | Mar. 28, 1950 |
| 2,614,187 | Dorothea | Oct. 14, 1952 |